E. WOERNER.
DISTRIBUTER FOR LUBRICATING PUMPS.
APPLICATION FILED MAY 20, 1910.
1,095,690.
Patented May 5, 1914.
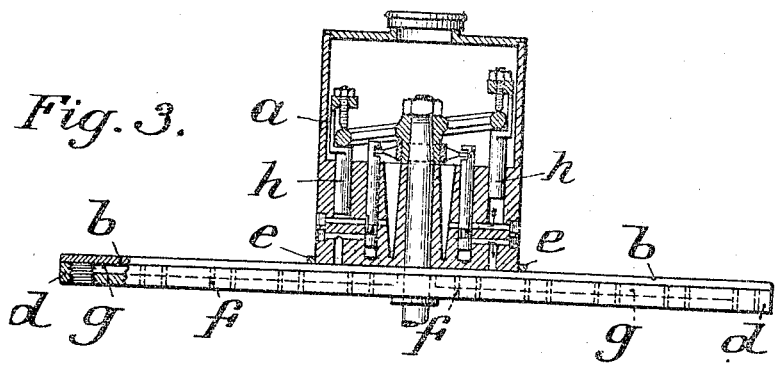
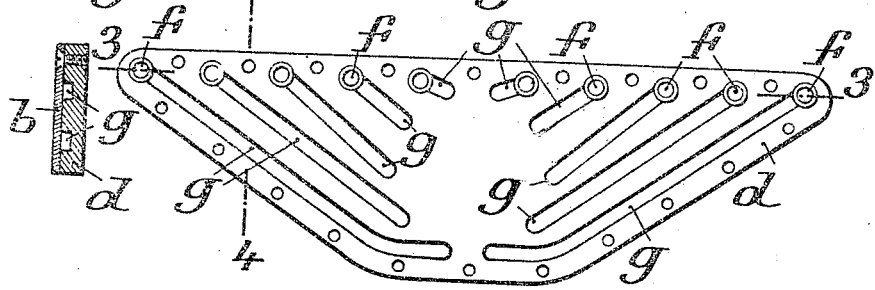
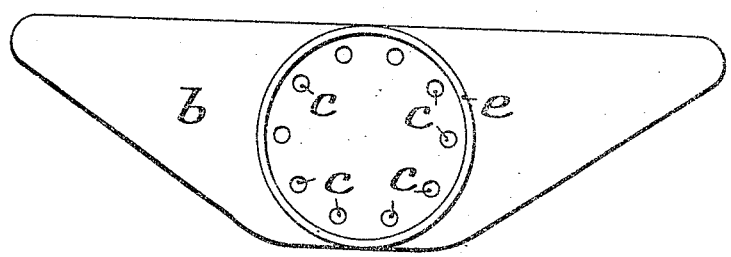
WITNESSES
INVENTOR
Eugen Woerner

UNITED STATES PATENT OFFICE.

EUGEN WOERNER, OF CANNSTATT, GERMANY, ASSIGNOR TO THE FIRM OF ROBERT BOSCH, OF STUTTGART, GERMANY.

DISTRIBUTER FOR LUBRICATING-PUMPS.

1,095,690.  Specification of Letters Patent.  Patented May 5, 1914.

Application filed May 20, 1910. Serial No. 562,367.

*To all whom it may concern:*

Be it known that I, EUGEN WOERNER, a subject of the Emperor of Germany, residing at Cannstatt, Germany, have invented certain new and useful Improvements in Distributers for Lubricating-Pumps; and I do hereby declare the following to be a full, clear, and exact description of the invention, such as will enable others skilled in the art to which it appertains to make and use the same.

The invention relates to lubricating pumps and mainly to lubricating pumps of that type wherein a plurality of pressure pumps are arranged in a circle about a power shaft and wherein by a corresponding number of pipe conduits the oil is supplied to the appropriate lubricating channels. This well known type of lubricating pumps offers particular advantages, inasmuch as in this way the space for operating the individual pumps is completely utilized. In some respects, however, it is accompanied with certain structural difficulties, inasmuch as the continuation of the individual lubricating conduits is relatively difficult of arrangement, if they cannot all be placed adjacent to each other in a single plane. For this reason, where lubricating pumps of this type have been heretofore employed, the individual pipe nipples arranged in a circle, which form the exit openings of the pumps, have been connected by individual correspondingly arched pipe conduits with the appropriate ends of the lubricating channels arranged adjacent to each other, for instance, in a single plane. By this expedient, the purpose is attained, it is true, of preserving the advantageous type of pump and the relation of the power shaft to the lubricating channels, but nevertheless the installation of the various pipe connections is disproportionately expensive and inasmuch as the auxiliary devices, such as couplings and the like, whereby the pipes are connected with the pump nipples and with the ends of the lubricating channels project to a relatively greater height, the device requires a correspondingly large amount of space.

The present invention consists in interposing between the pump and the lubricating channels a distributing plate which is of such character that it may be connected directly to the lubricating pump, and which is traversed by channels corresponding in number to the pumps. These channels are so arranged that they join the connecting portions of the pump boots with those of the corresponding lubricating channels.

In the drawings, Figure 1 represents the top plan view of the distributing plate, with the pump removed; Fig. 2 represents a top plan view of the base plate of the distributer after the removal of the cover plate thereof; Fig. 3 represents a section taken on a plane indicated by the line 3—3 of Fig. 2; and Fig. 4 represents a section taken on a plane indicated by the line 4—4 of Fig. 2.

Similar letters of reference indicate similar parts throughout the several views.

Referring to the drawings, it will be noted that the distributer consists of a base plate $d$, which may be cast in a single piece and in whose upper surface a number of open grooves $g$ are so arranged that their inner ends are located in a circle and all their outer ends in a long curve, or, say, a straight line. At these places, internally screw-threaded apertures $f$ are provided for the attachment of the lubricating pipes.

Upon the base plate $d$ a cover plate $b$ is fastened by means of screws, the cover plate $b$ being provided with apertures $c$. The apertures $c$ are arranged in a circle, so that they register with the inner ends of the grooves $g$ in the base plate when the cover plate is mounted in place upon the base plate. The apertures $c$ are included within a circular flange $e$ which serves as a means of attachment for the oil-container $a$ or of the pump itself. Within the oil receptacle $a$ the pumps $h$ are so arranged that above each aperture $c$ of the cover plate $b$, one of the pump boots is located. The motor shaft $i$ can be introduced through a hole in the plates $d$ and $b$, which hole can be made in the middle of the circle formed by the apertures $c$. The pump is like that disclosed in United States Letters Patent No. 956,016, granted to me on April 26, 1910.

It is obvious that the relative arrangement of the plates $b$ and $d$ may be reversed if desired.

What I claim is:

1. In combination with a lubricating system having a plurality of feed pumps grouped about a common center, and a casing for said feed pumps, of a distributer dishaving a plurality of inlets arranging subing a base for said pumps, said distributer having a plurality of inlets arranged substantially in a circle for communicating with individual feed pumps, a plurality of outlets arranged substantially in a straight line, and oil tight channels closed at their ends and extending between the respective inlets and outlets; substantially as described.

2. In combination with a lubricating system having a plurality of feed pumps, of a distributer forming a base for the feed pumps, said distributer embodying a distributer plate having a plurality of surface grooves closed at their ends and communicating with individual feed pumps and with individual feed outlets, and also embodying a closure plate fastened to the distributer plate to render the separate grooves oil tight between the respective feed pumps and feed outlets; substantially as described.

In testimony whereof I affix my signature, in presence of two witnesses.

EUGEN WOERNER.

Witnesses:
 MAX ANSCHÜTZ,
 REINHOLD ELWERT.